(12) United States Patent
Baker et al.

(10) Patent No.: US 7,765,485 B2
(45) Date of Patent: Jul. 27, 2010

(54) EXTENSIBLE USER INTERFACE FRAMEWORK FOR A COMPONENTIZED APPLICATION ENVIRONMENT

(75) Inventors: Bruce R. Baker, Markam (CA); Bhadrinarayanan O. Madapusi, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/342,770

(22) Filed: Jan. 30, 2006

(65) Prior Publication Data

US 2007/0192339 A1  Aug. 16, 2007

(51) Int. Cl.
G06F 3/048 (2006.01)
G06F 17/30 (2006.01)
G06F 9/445 (2006.01)
(52) U.S. Cl. .................. 715/762; 707/600; 717/174
(58) Field of Classification Search ............... 715/762; 707/600; 717/174
See application file for complete search history.

(56) References Cited

U.S. PATENT DOCUMENTS

| | | | | |
|---|---|---|---|---|
| 5,220,675 A | * | 6/1993 | Padawer et al. | 715/826 |
| 5,625,783 A | * | 4/1997 | Ezekiel et al. | 719/320 |
| 5,634,002 A | * | 5/1997 | Polk et al. | 714/38 |
| 5,960,403 A | * | 9/1999 | Brown | 705/2 |
| 5,982,367 A | * | 11/1999 | Alimpich et al. | 715/810 |
| 6,357,038 B1 | * | 3/2002 | Scouten | 717/122 |
| 6,370,537 B1 | * | 4/2002 | Gilbert et al. | 707/101 |
| 6,915,486 B2 | * | 7/2005 | Li et al. | 715/765 |
| 6,920,607 B1 | * | 7/2005 | Ali et al. | 715/206 |
| 6,968,503 B1 | | 11/2005 | Chang et al. | |
| 7,168,035 B1 | * | 1/2007 | Bell et al. | 715/234 |
| 7,236,982 B2 | * | 6/2007 | Zlatanov et al. | 707/102 |
| 7,296,034 B2 | * | 11/2007 | Cheslow | 707/104.1 |

(Continued)

FOREIGN PATENT DOCUMENTS

EP 0564845 10/1993

OTHER PUBLICATIONS

AltoWeb, 2000, "AltoClient: User's Guide", pp. 1-32.*

(Continued)

*Primary Examiner*—William L Bashore
*Assistant Examiner*—David Phantana-angkool
(74) *Attorney, Agent, or Firm*—James E. Bracken, Esq.; Steven M. Greenberg, Esq.; Carey, Rodriguez, Greenberg & Paul, LLP

(57) ABSTRACT

Embodiments of the present invention address deficiencies of the art in respect to extending the user interface of an application, and provide a method, system and computer program product for extending the user interface of an application in a componentized application environment. In one embodiment of the invention, a user interface extension method for a componentized application environment can include specifying in markup a set of user interface controls and further specifying in markup an extension to a user interface control in the set. The markup for the user interface control can be substituted with the markup for the extension. Thereafter, the markup for the extension and the set of user interface controls can be provided to a set of corresponding control factories, absent the substituted user interface control, for generation into user interface control instances defining a user interface for the componentized application environment.

18 Claims, 2 Drawing Sheets

U.S. PATENT DOCUMENTS

| | | | |
|---|---|---|---|
| 7,340,447 B2 * | 3/2008 | Ghatare | 707/3 |
| 7,392,522 B2 * | 6/2008 | Murray et al. | 717/174 |
| 7,426,734 B2 * | 9/2008 | Debique et al. | 719/310 |
| 7,496,837 B1 * | 2/2009 | Larcheveque et al. | 715/237 |
| 7,506,242 B2 * | 3/2009 | Kotler et al. | 715/209 |
| 7,596,579 B2 * | 9/2009 | Jung et al. | 707/104.1 |
| 7,630,997 B2 * | 12/2009 | Zhang et al. | 707/101 |
| 7,644,100 B2 * | 1/2010 | Chang et al. | 1/1 |
| 7,647,254 B2 * | 1/2010 | Cool | 705/27 |
| 2005/0091641 A1 | 4/2005 | Starbuck et al. | |

OTHER PUBLICATIONS

AltoWeb, 2000, "AltoStudio: User's Guide", pp. 1-144.*

* cited by examiner

EXTENSIBLE USER INTERFACE FRAMEWORK FOR A COMPONENTIZED APPLICATION ENVIRONMENT

BACKGROUND OF THE INVENTION

1. Field of the Invention

The present invention relates to the field of componentized application environments and more particularly to the extension of a user interface for a componentized application environment.

2. Description of the Related Art

A componentized application environment is an application environment constructed at runtime from an arrangement of application components specified as plug-ins to extension points of the componentized application environment. As embodied by the Eclipse™ platform (Eclipse is a trademark of the Eclipse Foundation having a Web site at the domain, eclipse.org), a componentized application environment can provide for the augmentation of the functionality or appearance of an application merely by declaring an extension point to an exposed portion of an existing application component, and by registering a plug-in to the application component to provide the additional functionality or appearance. In this way, existing applications can be easily extended without tampering with the underlying code of the application component.

Generally, a componentized application environment, including the Eclipse platform, can provide an extension model that allows application contributors to add new user interface components to an existing application. Specifically, the user interface of an existing application can be extended by creating a new plug-in to the componentized application environment, and by providing extension definitions for existing extension points. While the extension model provides a powerful method for adding new functionality to an application, the foregoing extension model does not allow for the modification or removal of existing application components.

More specifically, to ensure that an application can be reused in as many deployments of the application as possible, it is desirable to build an application such that the application can be modified to suit the requirements of a specific deployment. Also, to provide effective support and "fix-pack" delivery for a deployed application, it is desirable to apply deployment specific modifications without directly altering the assets of the application. Yet, at present, to modify a deployed application to suit the requirements of a specific deployment, or to apply a fix-pack to an existing deployment requires the direct modification of the deployed application.

For instance, in the Eclipse environment, a user interface can be created through the direct instructions of program code using a standard widget toolkit. As a result, to permit the external modification of the user interface programmatically, the developer must be certain to expose the relevant data and method members of the user interface. As an alternative, it is well known to utilize a markup language description of Eclipse user interface components in an application. In the latter circumstance, the inherent functionality of a standard widget toolkit can be sacrificed for the benefit of the extensibility of the user interface. Moreover, to extend the user interface defined by a markup language specification requires the modification of the markup language specification, thereby violating at least one premise of the Eclipse programming model and inhibiting the delivery of fix-packs in providing release to release migration.

BRIEF SUMMARY OF THE INVENTION

Embodiments of the present invention address deficiencies of the art in respect to extending the user interface of an application, and provide a novel and non-obvious method, system and apparatus for extending the user interface of an application in a componentized application environment. In one embodiment of the invention, a user interface extension method for a componentized application environment can include specifying in markup a set of user interface controls and further specifying in markup an extension to a user interface control in the set. The markup for the user interface control can be substituted with the markup for the extension. Thereafter, the markup for the extension and the set of user interface controls can be provided to a set of corresponding control factories, absent the substituted user interface control, for generation into user interface control instances defining a user interface for the componentized application environment.

In one aspect of the embodiment, specifying in markup a set of user interface controls can include defining a type for each of the user interface controls. The type can correspond to a user interface control factory enabled to produce instances of user interface controls having the defined type. Also, a manager type can be further defined for each of the user interface controls. The manager type can correspond to a widget manager enabled to manage behaviors for instance of user interface controls having the further defined manager type.

In another aspect of the invention, substituting the markup for user interface control with the markup for the extension can include specifying a user interface control extension point to the environment for an extension to the user interface control and further specifying a user interface control definition for the extension. As such, the extension point can be associated with a user interface control definition for the extension, and the extension can be identified as a substitute for the user interface control to be substituted with the extension when assembling a user interface for the environment.

In yet another aspect of the invention, a composition of a set of user interface controls can be declared in markup. Additionally, an extension to the composition can be further declared in markup. Subsequently, the markup for the composition can be substituted with the markup for the extension to the composition. Thereafter, the markup for the extension to the composition can be provided to a control factory for generation into an instance of a composition of instances of user interface controls defining a user interface for the componentized application environment.

In another embodiment of the invention, a componentized application environment data processing system can be configured for user interface extension. The system can include plug-ins defining a componentized application environment and a user interface framework for the componentized application environment. The user interface framework can include control factories, each control factory including program code enabled to generate a user interface control having a specified type from a user interface control definition declaring the specified type.

The user interface framework also can include widget managers, each widget manager including program code enabled to manage behaviors for a user interface control having a specified manager type from a user interface control definition declaring the specified manager type.

Finally, the user interface framework can include a configurator. The configurator can include program code enabled to identify extensions to defined user interface controls. Each extension can specify a replacement of one of the defined user interface controls. Thus, the configurator can identify which controls and composite definitions are to be replaced by new control and composite definitions.

Optionally, at least one of the control factories can include program code enabled to generate a composition of user interface controls from a composition declaration defined for the composition of user interface controls. In this regard, the composition declaration can specify a layout for the user interface controls selected from the group consisting of a grid layout, a form layout, a stack layout and a row layout.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for an extensible user interface framework for composite application environments. In accordance with an embodiment of the present invention, user interface controls in a composite application environment can be defined as an extension point to the environment. An originally specified user interface control defined for the environment can be extended through the definition of a replacement user interface control as an extension point, which replacement user interface control can refer to the identity of the originally specified user interface control. In this way, a user interface control for the environment can be modified without modifying the logic of the user interface control.

Notably, the framework of the present invention not only can relate to the definition of user interface controls, but also to the composition or arrangement of the user interface controls within a user interface of the environment. As such, an originally specified composition or arrangement of user interface controls for the environment can be extended through the definition of a replacement composition or arrangement of user interface controls as an extension point, which replacement composition or arrangement of user interface controls can refer to the identity of the originally specified composition or arrangement of user interface controls. As before, a composition or arrangement of user interface controls for the environment can be modified without modifying the logic of the composition or arrangement of user interface controls.

Figure 1:
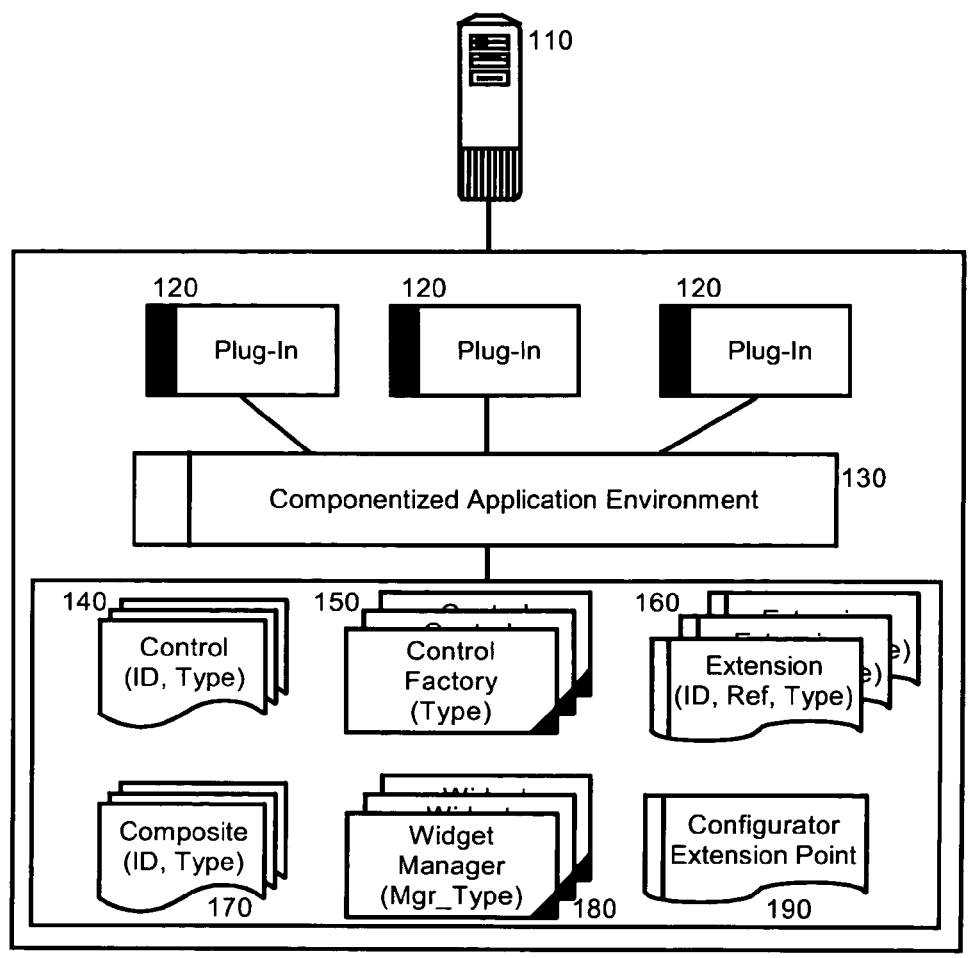
FIG. 1 is a schematic illustration of a componentized application environment configured for application user interface extensibility.

In further illustration, FIG. 1 is a schematic illustration of a data processing system hosting a componentized application environment configured for application user interface extensibility. The data processing system 110 can include a componentized application environment 130 supporting one or more plug-ins 120 to the environment 130. The environment 130 can be coupled to a user interface framework including a control factory 150, a widget manager 180 and a configurator extension point 190. The user interface framework further can include one or more defined controls 140, one or more defined compositions 170 of sets of the defined controls 140, and one or more user interface extensions 160, each defined as a replacement to either of an existing one of the defined controls 140 and an existing one of the defined compositions 170.

In operation, a user interface can be assembled from a selection of the defined controls 140. Each of the defined controls 140 can be defined in markup according to a document type definition (DTD) for a control. As well, each of the compositions 170 can be defined in markup according to a DTD for a composition. As part of its definition, controls 140 can specify a control type and a manager type. Utilizing the specified control type in the definition, the user interface framework can invoke an associated one of the control factories 150 registered as an extension point to the environment 130 to create an instance of the defined one of the controls 140. Similarly, utilizing the specified manager type in the definition, the user interface framework can invoke an associated one of the widget managers 180 to manage the behavior of the defined one of the controls 140.

An application integrator utilizing the framework can customize the user interface of the environment 130 by identifying the controls 140 in the user interface of the environment that are to be modified, and further by identifying corresponding replacement ones of the controls 140 in the form of extensions 160. The configurator extension point 190 includes program code enabled to define a properties file (not shown) specifying which new control definitions in the extensions 160 are to replace existing control definitions for controls 140 in the user interface. The program code of the configurator extension point 190 applies the new control definitions in the extensions 160 in place of the existing control definitions of the controls 140 when configuring the user interface of the environment 130. Consequently, the underlying application components of the environment 130 need not be modified in order to modify the user interface of the environment 130.

Figure 2:
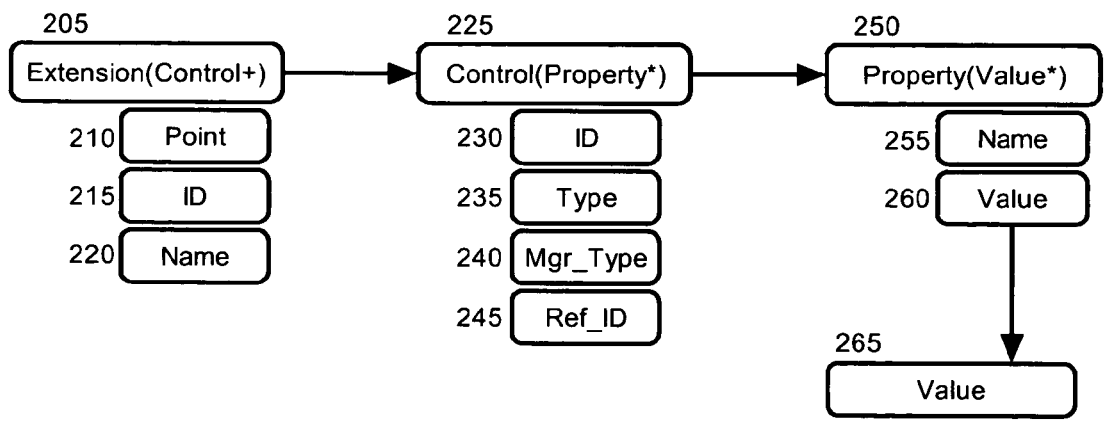
FIG. 2 is a block diagram illustrating an extensible user interface control for use in the componentized application environment of FIG. 1.

In more particular illustration, FIG. 2 is a block diagram illustrating a DTD for an architecture for an extension to a user interface in the componentized application environment of FIG. 1. The architecture can include an extension 205 to the user interface of the componentized application environment. The extension 205 can be an extension point and can include as properties a fully qualified identifier 210 of the extension 205, a unique optional identifier 215 of the target user interface control to be extended by the extension 205, and an optional name 220 for the instance of the extension 205. Notably, the extension 205 can include one or more control definitions 225.

Each control definition 225 can include a unique identifier 230 for the control definition 225, a control type 235 specifying the type control factory required to create an instance of the control defined by the control definition 225. The control types 235 can include by way of example, a text control, a label control, a required label, a combo box, a list box, a push button, a check box, radio button, table, composite, group, separator, scrolled composite and toolbar, to name a few. The control definition 225 further can include a manager type 240 specifying the type of widget manager expected to manage the instance of the control defined by the control definition, and a reference identifier 245 identifying another control definition upon which the control definition 225 is to be based and from which the control definition 225 is to inherit properties that can be overridden by explicitly defined properties in the control definition.

Each control definition 225 can refer to a property element 250. The property element 250 can be used to describe a property of the control definition 225 and can be made available to a control factory when a control instance is created for the control definition 225. Likewise, the property element 250 can be provided to a widget manager when an instance of the control definition 225 is managed. The property element 250 can include a name attribute 255 and a value attribute 260. The name attribute 255 can refer to name of an instance of the property element 250 and the value attribute 260 can have a single value for an instance of the property element 250. For multiple values in a list, however, a value element 265 can be provided for the property element 250, where instances of the value element 265 can provide multiple values for an instance of the property element 250.

Once user interface controls have been defined for a user interface for the environment, the layout of the user interface controls can be defined. For instance, composites and layout definitions can be provided to specify the layout. In the present invention, a composite is itself an instance of a control and can be declared using the controls extension point of FIG. 2 with a control type of "composite". In addition, another extension point to the environment can be provided, referred to as "compositeDefinitions", that can allow the declaration of the composite layout according to layout type, for instance a grid layout type, form layout type, stack layout type and row layout type to name only a few. As such, a composite control factory can process the composite definition associated with one or more controls to identify the layout and child controls for the composite.

Figure 3:
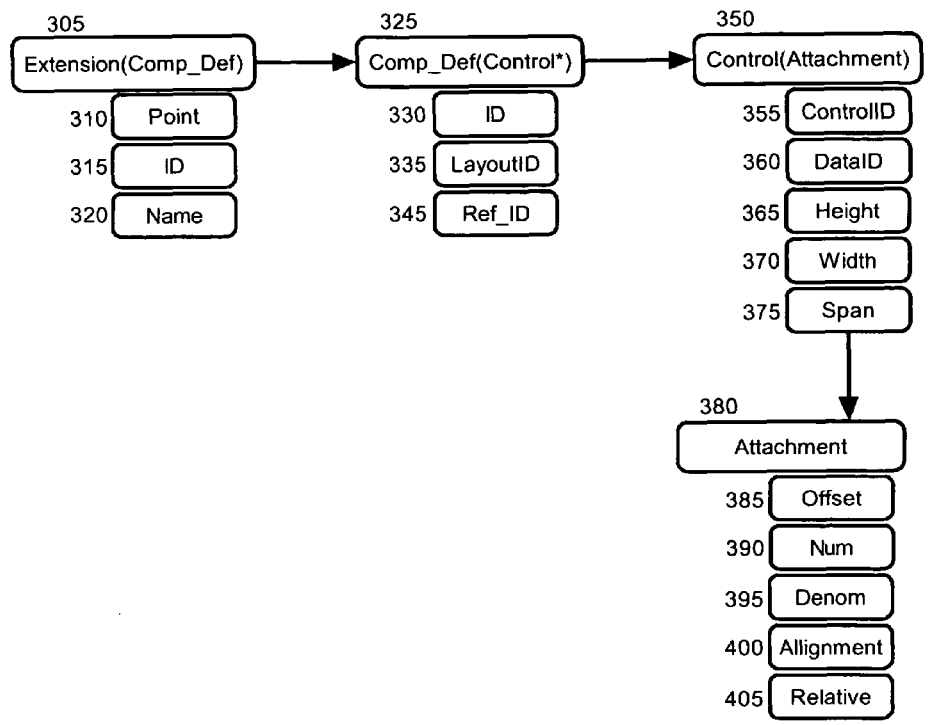
FIG. 3 is a block diagram illustrating an extensible user interface control composition for use in the componentized application environment of FIG. 1; and, FIG. 4 is a flow chart illustrating a process for extending a user interface control in the user interface of an application within a componentized application environment.

In more particular illustration, FIG. 3 is a block diagram illustrating a DTD for an architecture for a composite definition extension point to a user interface in the componentized application environment of FIG. 1. The architecture can include a composite extension 305 for a composite definition. The composite extension 305 can be an extension point and can include as properties a fully qualified identifier 310 of the extension 305, a unique optional identifier 315 of the target user interface composite to be extended by the extension 305, and an optional name 320 for the instance of the extension 305. Notably, the extension 305 can include one or more composite declarations 325.

Each composite declaration 325 can include a unique identifier 330 for the composite declaration 325. Each composite declaration 325 further can include a layout identifier 335. The layout identifier 335 can refer to a layout declaration associated with the composite declaration 325. Exemplary layout declarations include a grid layout declaration, a form layout declaration, a stack layout declaration and a row layout declaration. Finally, each composite declaration 325 can include a reference identifier 345. The reference identifier 345 can identify another composite declaration upon which the composite declaration 325 is to be based and from which the composite declaration 325 is to inherit properties that can be overridden by explicitly defined properties in the composite declaration 325.

Each composite declaration 325 can refer to one or more child control elements 350. A child control element 350 can include a control identifier 355 used to create a child control. The control identifier 355 can match the identifier attribute of a control element defined as an extension to a controls extension point. The control identifier 355 can include other attributes, depending upon the layout type of an associated composite declaration 325. For instance, in the case of a grid layout, the child control element 350 also can include a data identifier 360 referring specifically to a grid layout and a grid data declaration and can match the identifier attribute of a grid data element defined as an extension to a grid data extension point. By comparison, in the case of a form layout, the child control 350 also can include a height, width and span attributes 365, 370, 375 for use in a form composite definition.

Specifically referring to a form layout for a composite declaration 325, the control identifier 355 can include an attachment element 380. The attachment element 380 can include left, right, top and bottom species, each of which can describe the attachment of a form on a designated side of an associated control in a form composite. The attachment element 380 can specify an offset 385, in pixels, of the control side from the attachment position of the form. The attachment element 380 also can include numerator and denominator attributes 390, 395 for specifying the placement of a form, and an alignment attribute 400 specifying the alignment of the form. Finally, a relative control identifier 405 can be provided to identify the control to which the form is to be attached.

Figure 4:
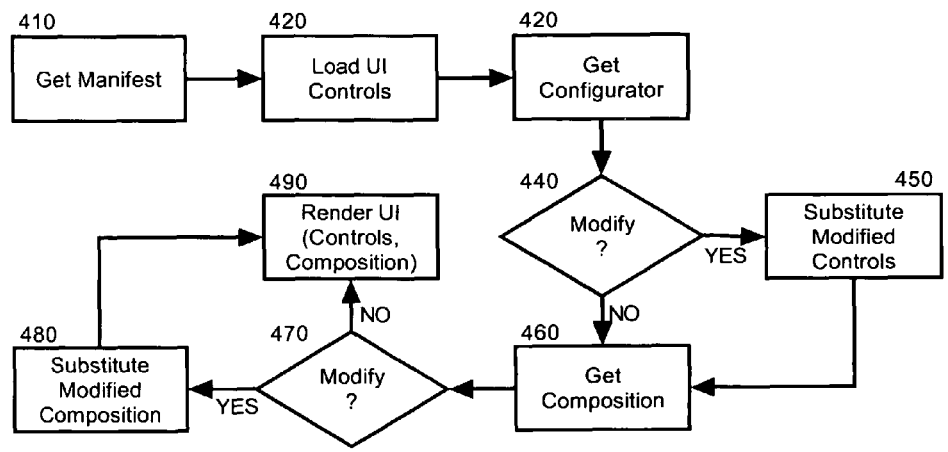

In operation, DTD defined architecture of FIGS. 2 and 3 can be leveraged to permit the modification of a user interface for a componentized application environment without distributing the underlying code of each application component in the environment. In yet further illustration, FIG. 4 is a flow chart illustrating a process for extending a user interface control in the user interface of an application within a componentized application environment. Beginning in block 410, a manifest can be retrieved which indicates a selection of user interface controls to be included in a user interface for the environment. In block 420, a markup language specification conforming to the controls DTD for the user interface controls can be loaded and in block 430 the configurator can be loaded to determine which of the user interface controls are to be modified based upon referenced extensions to the controls.

In decision block 440, if the configurator determines that user interface controls are to be modified, in block 450 the existing controls to be replaced can be identified and substituted with replacement user interface controls. Subsequently, in block 460 a composition can be retrieved indicating a layout for the user interface controls. Again, the configurator can determine in decision block 470 whether or not to replace an existing layout for the controls. If so, in block 480 the existing composition of user interface controls can be replaced with a modified composition. Finally, in block 490, the user interface can be rendered for the environment including the user interface controls arranged according to a layout defined by the composition. In this regard, the markup for the controls and the compositions can be passed to relevant control factories for producing respective instances of the defined controls in the user interface.

It will be recognized by the skilled artisan that in the present invention, a user interface can be specified through markup language definitions of user interface controls and markup language definitions of compositions of user interface controls. Control factories enabled to produce controls and compositions of a particular type can be configured process markup language defined controls and compositions to produce instances of respective user interface controls and compositions.

Modifying a user interface control or composition, then, requires only the markup language definition of an extension to a control or composition. A configurator can recognize a manifest indicating the replacement of a user interface control or composition with an extension and the markup for the latter can substitute for the former. Thereafter, the substituted extension can be provided to a suitable factory for producing an instance defining the user interface for the componentized application environment. Yet, the modification to the user interface can be applied without modifying any underlying source code for the user interface for any application component in the environment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A user interface extension method for a componentized application environment, the method comprising:

specifying in markup a set of user interface controls;

identifying within a manifest markup for a set of extensions to corresponding ones of the user interface controls in the set of user interface controls;

substituting markup for each of the corresponding ones of the user interface controls specified in the markup with markup for an associated one of the extensions identified within the manifest; and, providing markup for each of the extensions and the corresponding ones of the user interface controls in the set to corresponding control factories without also providing a substituted user interface control for each of the corresponding ones of the user interface controls to the corresponding control factories, the markup being provided for generation into user interface control instances in a data processing system including a componentized application environment supporting one or more plug-ins to the environment, the user interface control instances defining a user interface for the componentized application environment.

2. The method of claim 1, wherein specifying in markup a set of user interface controls, comprises:

defining a type for each of the user interface controls, the type corresponding to a user interface control factory enabled to produce instances of user interface controls having the defined type; and, further defining a manager type for each of the user interface controls, the manager type corresponding to a widget manager enabled to manage behaviors for instance of user interface controls having the further defined manager type.

3. The method of claim 2, wherein substituting markup for each of the corresponding ones of the user interface controls specified in the markup with markup for an associated one of the extensions identified within the manifest, comprises:

specifying a user interface control extension point to the environment for each extension to a corresponding one of the user interface controls;

further specifying a user interface control definition for the extension;

associating the extension point with a user interface control definition for the extension; and, identifying the extension as a substitute for the corresponding one of the user interface controls to be substituted with the extension when assembling a user interface for the environment.

4. The method of claim 1, further comprising:

declaring in markup a composition of a set of user interface controls;

further declaring in markup an extension to the composition;

substituting the markup for composition with the markup for the extension to the composition; and, providing the markup for the extension to the composition to a control factory for generation into an instance of a composition of instances of user interface controls defining a user interface for the componentized application environment.

5. The method of claim 4, wherein declaring in markup a composition of a set of user interface controls, comprises declaring in markup a grid layout composition of a set of user interface controls.

6. The method of claim 4, wherein declaring in markup a composition of a set of user interface controls, comprises declaring in markup a form layout composition of a set of user interface controls.

7. A computer program product for extending a user interface for a componentized application environment, the computer program product comprising:
   a computer readable storage medium having computer readable program code embodied therewith, the computer readable program code comprising:
   computer readable program code for specifying in markup a set of user interface controls;
   computer readable program code for identifying within a manifest markup for a set of extensions to corresponding ones of the user interface controls in the set of user interface controls;
   computer readable program code for substituting markup for each of the corresponding ones of the user interface controls specified in the markup with markup for an associated one of the extensions identified within the manifest; and,
   computer readable program code for providing markup for each of the extensions and the corresponding ones of the user interface controls in the set to corresponding control factories without also providing a substituted user interface control for each of the corresponding ones of the user interface controls to the corresponding control factories, the markup being provided for generation into user interface control instances in a data processing system including a componentized application environment supporting one or more plug-ins to the environment, the user interface control instances defining a user interface for the componentized application environment.

8. The computer program product of claim 7, wherein the computer readable program code for specifying in markup a set of user interface controls, comprises:
   computer readable program code for defining a type for each of the user interface controls, the type corresponding to a user interface control factory enabled to produce instances of user interface controls having the defined type; and,
   computer readable program code for further defining a manager type for each of the user interface controls, the manager type corresponding to a widget manager enabled to manage behaviors for instance of user interface controls having the further defined manager type.

9. The computer program product of claim 8, wherein the computer readable program code for substituting markup for each of the corresponding ones of the user interface controls specified in the markup with markup for an associated one of the extensions identified within the manifest, comprises:
   computer readable product code for specifying a user interface control extension point to the environment for each—extension to a corresponding one of the user interface controls;
   computer readable product code for further specifying a user interface control definition for the extension;
   computer readable product code for associating the extension point with a user interface control definition for the extension; and,
   computer readable product code for identifying the extension as a substitute for the corresponding one of the user interface controls to be substituted with the extension when assembling a user interface for the environment.

10. The computer program product of claim 7, further comprising:
    computer readable program code for declaring in markup a composition of a set of user interface controls;
    computer readable program code for further declaring in markup an extension to the composition;
    computer readable program code for substituting the markup for composition with the markup for the extension to the composition; and,
    computer readable program code for providing the markup for the extension to the composition to a control factory for generation into an instance of a composition of instances of user interface controls defining a user interface for the componentized application environment.

11. The computer program product of claim 10, wherein the computer readable program code for declaring in markup a composition of a set of user interface controls, comprises computer readable program code for declaring in markup a grid layout composition of a set of user interface controls.

12. The computer program product of claim 10, wherein the computer readable program code for declaring in markup a composition of a set of user interface controls, comprises computer readable program code for declaring in markup a form layout composition of a set of user interface controls.

13. A data processing system for extending a user interface for a componentized application environment, the system comprising:
    a computer with at least one processor and memory; and,
    a configurator extension point executing in the memory of the computer, the configurator:
    specifying in markup a set of user interface controls;
    identifying within a manifest markup for a set of extensions to corresponding ones of the user interface controls in the set of user interface controls;
    substituting markup for each of the corresponding ones of the user interface controls specified in the markup with markup for an associated one of the extensions identified within the manifest; and,
    providing markup for each of the extensions and the corresponding ones of the user interface controls in the set to corresponding control factories without also providing a substituted user interface control for each of the corresponding ones of the user interface controls to the corresponding control factories, the markup being provided for generation into user interface control instances in a data processing system including a componentized application environment supporting one or more plug-ins to the environment, the user interface control instances defining a user interface for the componentized application environment.

14. The system of claim 13, wherein the configurator extension point:
    further defines a type for each of the user interface controls, the type corresponding to a user interface control factory enabled to produce instances of user interface controls having the defined type; and,
    further defines a manager type for each of the user interface controls, the manager type corresponding to a widget manager enabled to manage behaviors for instance of user interface controls having the further defined manager type.

15. The system of claim 14, wherein substituting the markup for user interface control with the markup for the extension, comprises:
    specifying a user interface control extension point to the environment for each—extension to a corresponding one of the user interface controls;
    further specifying a user interface control definition for the extension;
    associating the extension point with a user interface control definition for the extension; and, identifying the extension as a substitute for the corresponding one of the user interface controls to be substituted with the extension when assembling a user interface for the environment.

16. The system of claim 14, wherein the configurator further:
   declares in markup a composition of a set of user interface controls and an extension to the composition;
   substitutes the markup for composition with the markup for the extension to the composition; and,
   provides the markup for the extension to the composition to a control factory for generation into an instance of a composition of instances of user interface controls defining a user interface for the componentized application environment.

17. The system of claim 16, wherein the system in declaring in markup a composition of a set of user interface controls, declares in markup a grid layout composition of a set of user interface controls.

18. The system of claim 16, wherein the configurator in declaring in markup a composition of a set of user interface controls, declares in markup a form layout composition of a set of user interface controls.

* * * * *